United States Patent [19]

Grosbach et al.

[11] Patent Number: 5,649,177
[45] Date of Patent: Jul. 15, 1997

[54] CONTROL LOGIC FOR VERY FAST CLOCK SPEEDS

[75] Inventors: Lyle Edwin Grosbach, Rochester; David John Krolak, Dodge Center; David Wayne Marquart, Rochester, all of Minn.

[73] Assignee: International Business Machines Corporation, Armonk, N.Y.

[21] Appl. No.: 563,561

[22] Filed: Nov. 28, 1995

Related U.S. Application Data

[63] Continuation of Ser. No. 80,609, Jun. 21, 1993.
[51] Int. Cl.⁶ .................................................. G06F 1/10
[52] U.S. Cl. ............................................................ 395/560
[58] Field of Search ................................................ 395/550

[56] References Cited

U.S. PATENT DOCUMENTS

| | | | |
|---|---|---|---|
| 3,560,860 | 2/1971 | Gueldenpfennig | 327/141 |
| 3,745,472 | 7/1973 | Garth | 327/153 |
| 4,223,392 | 9/1980 | Lemaire et al. | 395/550 |
| 4,463,440 | 7/1984 | Nishiura et al. | 364/900 |
| 4,486,862 | 12/1984 | Wyber | 367/13 |
| 4,823,262 | 4/1989 | Calle | 364/200 |
| 4,835,728 | 5/1989 | Si et al. | 364/900 |
| 5,039,950 | 8/1991 | McDermott | 327/144 |
| 5,087,829 | 2/1992 | Ishibashi et al. | 327/152 |
| 5,122,679 | 6/1992 | Ishii et al. | 327/147 |
| 5,247,656 | 9/1993 | Kabuo et al. | 395/550 |

OTHER PUBLICATIONS

Marston, Ray, "Down Counter CookBook", Radio Electronics Feb. 1989, pp. 71–77.

IBM Technical Disclosure Bulletin, "Method of Assuring a Two–Cycle Start, Zero–Cycle Stop, Non–Chopping on Chip Clock Control Throughout a VLSI Clock System", vol. 32, No. 4B, Sep. 1989, pp. 246–248.

Wagner, K.D., "Clock System Design", IEEE Design & Test of Computers, vol. 5, Iss. 5, pp. 9–27 Oct. 1988.

*Primary Examiner*—Alvin E. Oberley
*Assistant Examiner*—St. John Courtenay, III
*Attorney, Agent, or Firm*—Steven W. Roth

[57] ABSTRACT

The ability to harmonize the activities of individual computer system components with control signals is key to the operation of any computer system. Examples of this need for control include the need to write data to multiple registers on the same clock cycle, the need to clear values on multiple entities on the same clock cycle, and the need to stop and start the master clock pulse train itself. In the past, providing this control was not a problem because control signals could be reliably sent to all the timing dependent components within a single cycle of the master clock pulse train. This control methodology is called "single cycle control." Today, however, single cycle control is not trustworthy in all situations. Master clock pulse trains are so fast that single cycle control is no longer reliable when timing dependent components reside in locations distant from the control signal generating circuitry. The present invention provides reliable control in all cases, including the situation where a master clock pulse train is so fast that single cycle control is not viable.

21 Claims, 7 Drawing Sheets

CONTROL LOGIC FOR VERY FAST CLOCK SPEEDS

This application is a continuation of application Ser. No. 08/080,609 filed Jun. 21, 1993.

FIELD OF THE INVENTION

The present invention relates to digital data-processing systems. More specifically, this invention relates to computer system control signals.

BACKGROUND OF THE INVENTION

Most every digital data-processing system includes a clock. Generated by an oscillator circuit, clocks emit electrical pulses which are used to synchronize almost every operation of the system. When taken together, these electrical pulses form a pulse train. In most cases, events within the individual timing dependent components of a data processing system must occur in a particular sequence.

A timing dependent component is any component that is required to be in step with the master clock pulse train to ensure proper operation of the computer system. A timing dependent component may be an individual digital circuit, a grouping of individual digital circuits, or any other clock dependent system entity. For example, the central processing unit (CPU) executes instructions, parts of instructions, and parts of parts of instructions in step with the pulse train that is emitted by a master system clock. Conventional data latches receive data, store data, and transfer it in response to different clock signals. On a larger scale, buses regulate the flow of data from one unit to another according to these clock signals. Storage registers must receive address and data signals in a predetermined order. Similarly, registers at different locations on a processor chip and on different chips must exchange sequential signals without overlap.

Simply stated, a computer system cannot function without a trustworthy master clock. Beyond being trustworthy, the performance of the computer system itself is directly dependent upon the speed at which a master clock operates. Since system performance (i.e., response time) is critical to the success of any given computer system, engineers are designing computer systems with faster and faster clocks. While super fast master clocks are desirable from a sales perspective, they present terrible internal control problems to computer system designers. As mentioned, proper function of timing dependent components requires that they are all in step with the master clock pulse train. However, beyond this requirement is the need to propagate internal control signals so as to harmonize the timing dependent components in a way that allows the computer system to operate.

Hence, proper operation of the computer system depends upon the ability to make internal control signals affect all of the timing dependent components at the same time. In the past, providing this control was not a problem because control signals could be reliably sent to all the timing dependent components within a single cycle of the master clock pulse train. This is called single cycle control. Today, however, single cycle control is not trustworthy in all situations. Master clock pulse trains are so fast that single cycle control is no longer reliable when timing dependent components reside in locations distant from the control signal generating circuitry. These timing dependent components are said to reside outside of the single cycle domain. Accordingly, as clock speeds continue to increase, the single cycle domain is shrinking.

One possible solution to this problem is to introduce delay into the control methodology so as to ensure that distant timing dependent components receive control signals at the same time as closer timing dependent components. However, the longer the delay period, the more uncertain delay becomes. If the delay is most likely two clock cycles, there may be a chance that in fast circuits the control signal will actually arrive in one cycle. If the delay is increased to ensure that it is impossible for control signals to arrive in one cycle, the control signal may in the end take three cycles to arrive. Such delays can be carefully adjusted during manufacturing, but this is extremely expensive. Further as circuits age, they often speed up or slow down. Hence, expensive reworking may be required.

Another solution to this problem is the use of expensive, high-speed technology which is itself fast enough to ensure that the control signal reaches the requisite components on time. However, this possible solution merely leaves the design engineer with a choice between a costly solution and no solution at all. Further, it is clear that even this expensive alternative will become unavailable as clock speeds become so fast that even the most costly solutions prove inadequate.

SUMMARY OF THE INVENTION

The principal object of this invention is to provide an enhanced computer system which includes a low cost means for providing internal computer system control on computer systems which operate at clock speeds that make a complete single cycle solution impractical.

Another object of this invention is to provide a low cost method and apparatus for inhibiting and allowing access of a master clock pulse train to timing dependent components of a computer system.

A further object of this invention is to provide a low cost method and apparatus for inhibiting and allowing access of a master clock pulse train to timing dependent components of a computer system by supplying multiple control signals to selected timing dependent components and a single control signal to the remaining timing dependent components.

These and other objects are accomplished by the enhanced control logic disclosed herein.

As mentioned above, the ability to harmonize the activities of individual timing dependent components with control signals is key to the operation of any computer system. Examples of this need for control include the need to write data to multiple registers on the same clock cycle and the need to clear values on multiple entities on the same clock cycle. However, perhaps the best example of this control requirement is the need to stop and start the master clock pulse train itself. The ability to start the master clock pulse train on the same clock pulse on all the timing dependent components and the ability to stop the master clock pulse train on the same pulse on all the timing dependent components are critical to the proper operation of a computer system. If the components of the computer system are not started on the same clock pulse, there is no efficient way in which the computer system can itself be started and proceed to begin performing its task. Likewise, it is crucial that service computers and test engineers be able to stop the computer system in a known state so as to properly diagnose problems with the computer system.

It is important to understand that while the nomenclature used in the art continues to be that of "start" and "stop," the master clock pulse train that is generated by the oscillator circuit is never (absent startup or shutdown of the computer system itself) actually started or stopped. Rather, the master clock pulse train is either prevented from reaching the timing dependent components (i.e., stopped) or the master clock pulse train is allowed to access the timing dependent components (i.e., started). The master clock is allowed to achieve a stable state to avoid variation and distortion (i.e., clock skew control which is not the subject of this invention). Accordingly, gating mechanisms reside on each of the timing dependent components rather than within the oscillator circuitry.

When applied to clock control, the enhanced control logic of the present invention provides a means in which a high speed master clock pulse train can be started and stopped in a consistent manner; without the need to ensure that a clock control signal arrives at all of the timing dependent components within one clock cycle. The control logic of the present invention is incorporated into both the master clock oscillator mechanism and gating mechanism circuitry which resides on each timing dependent component.

The control logic of the present invention provides control through the use of three control signals. The control logic is thought of (defined as) clock control logic when used to control a master clock pulse train. Similarly, control signals are thought of (defined as) clock control signals when used to control a master clock pulse train. The first of these control signals, Clock Rendezvous, is generated by that part of the control logic which is part of the master clock oscillator mechanism. Like the master clock signal itself, Clock Rendezvous is a continuous pulse train. The difference is that Clock Rendezvous operates at a much slower speed. Clock Rendezvous is used by the gating mechanisms of the present invention to identify a range of pulses within the master clock pulse train which are candidates (i.e., candidate pulses) for a control event (i.e., in this case, a stop or a start requirement). Since Clock Rendezvous is a continuous pulse train, ranges of candidate pulses will be continually identified. To be used to identify a range of candidate pulses, Clock Rendezvous could, in the simplest scenario, have a pulse width equal to twice that of the pulses of the master clock pulse train (i.e., be one half the speed of the master clock pulse train or slower). However, the slower the speed of the Clock Rendezvous signal, the more pulses that are available for selection as a point to start or stop the master clock pulse train. For example, by using a conventional divide by eight circuit, a 25 MHz Clock Rendezvous control signal could be derived from a 200 MHz master clock pulse train. This would provide a range of eight pulses which could be used as a point to start or stop the master clock pulse train.

Each time the gating mechanisms receive Clock Rendezvous they generate an internal signal called Clock Synchronization Point (Clock Synch Point for short). Clock Synch Point is a single, full cycle pulse which is used to identify the actual master clock pulse (i.e., the selected pulse) which has been chosen out of the candidate pulses (i.e., those identified by Clock Rendezvous) which can then be used to start or stop the master clock pulse train. The actual pulse that is chosen out of the candidate pulses is not significant. The only requirement is that all the gating mechanisms choose the same pulse. If, for example, we consider the 25 MHz Clock Rendezvous signal discussed above, each gating mechanism could be designed to always generate a Clock Synch Point based on the second of the eight pulses. This would mean that each gating mechanism would simultaneously generate a Clock Synch Point every 40 nanoseconds.

While the gating mechanisms do generate a Clock Synch Point at the same frequency as Clock Rendezvous, the Clock Synch Point is ignored until the gating mechanisms receives an external stimulus indicating that the next Clock Synch Point is to be used to start or stop the master clock pulse train. This external stimulus is called Clock Event. Clock Event may be generated by a service processor, human intervention, or some other external means. In general, the way in which the Clock Event signal is generated is not of consequence to the present invention. However, two aspects of the Clock Event signal are important. First, Clock Event must be delivered to each timing dependent component. Second, the mechanism that generates the Clock Event signal must also have access to the Clock Rendezvous signal so that they are able to generate and deliver Clock Event signals between Clock Synch Points.

DETAILED DESCRIPTION

Figure 1:
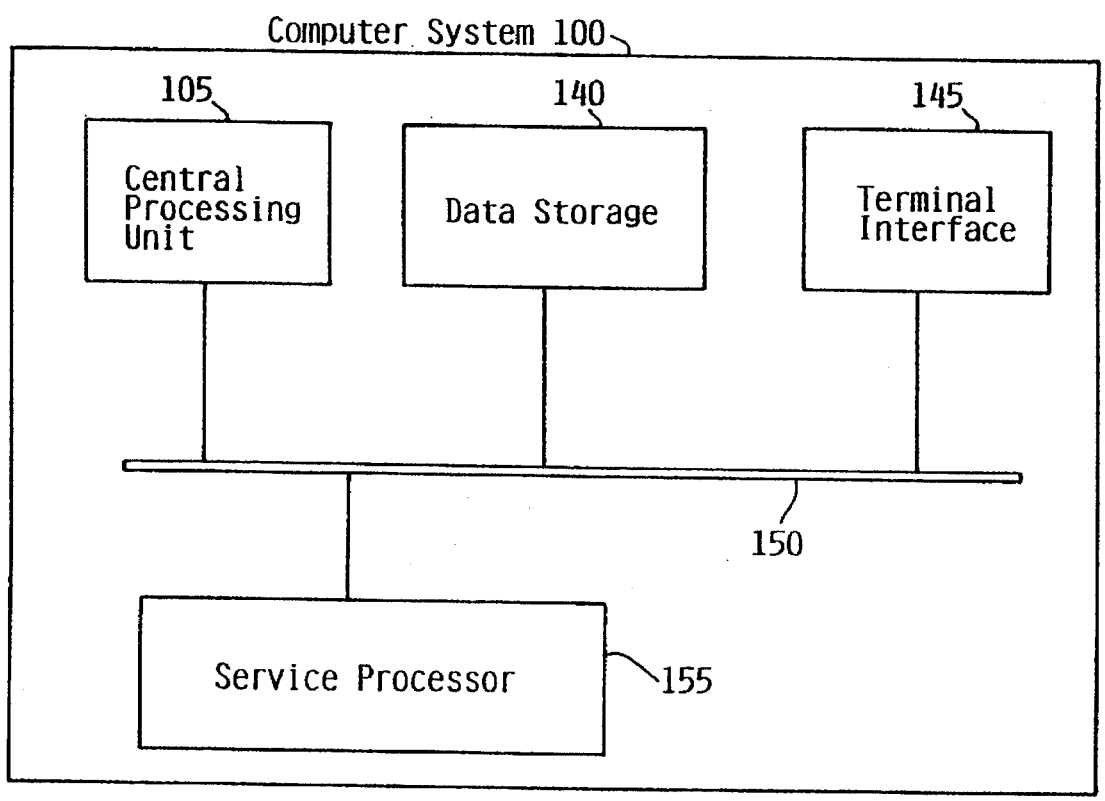
FIG. 1 is a block diagram of the computer system of the present invention.

FIG. 1 shows a block diagram of the computer system of the present invention. The computer system of the preferred embodiment is an enhanced IBM AS/400 mid-range computer system. However, any computer system that uses clocks could be used. As shown in the exploded view of FIG. 1, computer system 100 comprises main or central processing unit (CPU) 105 connected to data storage 140, terminal interface 145, and service processor 155 via system bus 150. Terminal interface 145 allows system administrators and computer programmers to communicate with computer system 100, normally through programmable workstations. Although the system depicted in FIG. 1 contains only a single main CPU and a single system bus, it should be understood that the present invention applies equally to computer systems having multiple main CPUs and multiple I/O buses. Similarly, although the bus of the preferred embodiment is a typical hardwired, multidrop bus, any connection means that supports bi-directional communication could be used. Service processor 155 performs a variety of tasks. Among its more important tasks, service processor 155 is used to start and stop the master clock of computer system 100.

As stated, the problem with current control solutions is that they cannot, without great expense or inefficiency, operate at high clock speeds. The control logic of the present invention provides reliable control of timing dependent components without the need to ensure that a control signal arrives within one clock cycle. Since clock control is an area of great applicability of the present invention, a clock control example will be used to show how the present invention provides reliable control in a computer system where single cycle control is impractical. However, those of skill in the art will understand that the present invention applies equally to other similar situations (e.g., synchronously writing data into independent data registers, synchronously clearing data in separate locations, or in any situation which requires two or more predetermined functions to take place on the same clock pulse).

It is also important to point out that computer systems will typically be comprised of some timing dependent components which are reachable within one clock cycle and some timing dependent components which are not reachable within one clock cycle. The best example of this is the multi-chip module (MCM). An MCM is made up of many individual timing dependent digital circuits (i.e., latches and the like). With today's high clock speeds, it is very difficult to get control signals to each MCM within a single clock cycle. However, it is neither difficult nor expensive to achieve consistent control amongst individual timing dependent circuits on any given MCM. Therefore, while the control logic of the present invention can be used to supply control (e.g., clock control) to all timing dependent components, the preferred embodiment is to use the control logic of the present invention only where needed and to use single cycle control in those situations where it remains viable. Since single cycle control is well known to those of ordinary skill in the art, design details are not set out herein.

Figure 2:
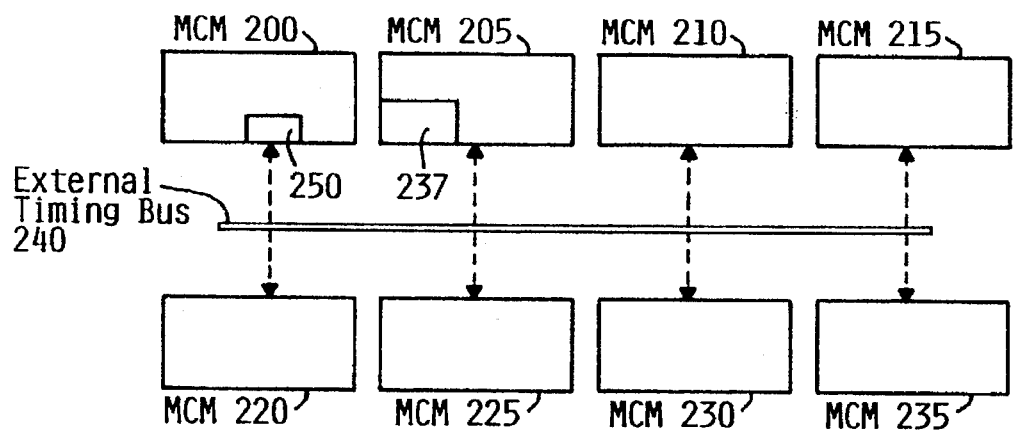
FIG. 2 is a block diagram of the central processing unit (CPU) of the present invention.

FIG. 2 shows that CPU 105 of computer system 100 is made up of 8 MCMs. MCMs 200, 205, 210, 215, 220, 225, 230, and 235 are shown to be interconnected via external timing bus 240. While MCM 200 is further shown to include master clock oscillator circuitry 250, it should be understood that master clock oscillator circuitry 250 need not necessarily reside on an MCM and that the present invention does not depend upon the particular location of master clock oscillator circuitry 250. For example, master clock oscillator circuitry 250 could just as easily be placed on a card or be packaged independently in some other manner. Master clock oscillator circuitry 250 is used to supply the master clock pulse train to the other MCMs of CPU 105. Master clock oscillator circuitry 250 also supplies the other timing dependent components of computer system 100 with the master clock pulse train (not shown). Besides supplying the master clock pulse train, master clock oscillator circuitry 250 also supplies the Clock Rendezvous signal. The Clock Rendezvous signal will be described in the text accompanying FIGS. 4 through 5D.

Figure 3:
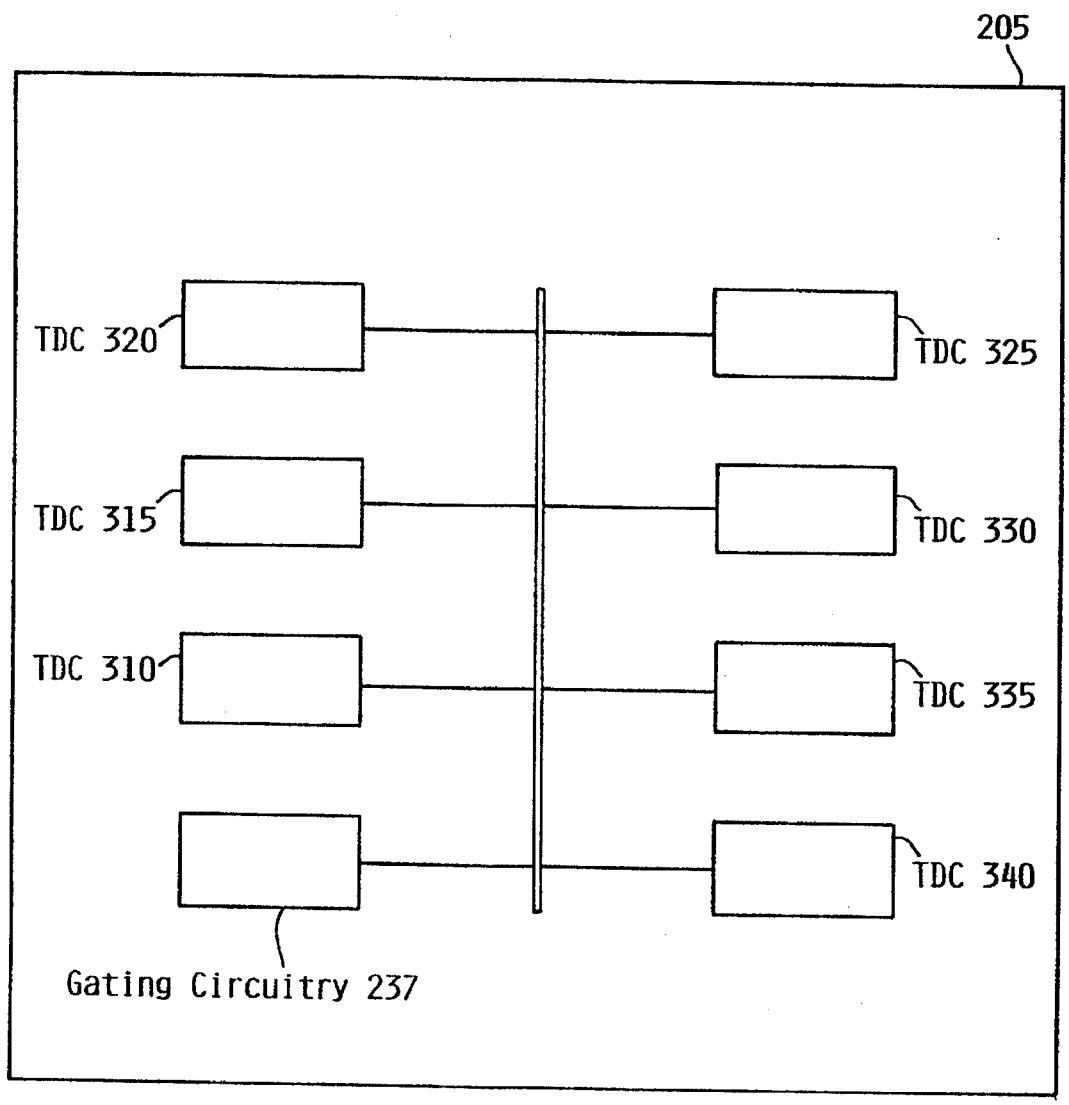
FIG. 3 is an exploded view of the multi-chip module (MCM) upon which the master clock oscillator resides.

FIG. 3 shows an exploded view of MCM 205. MCM 205 contains gating circuitry 305 and timing dependent components (TDCs) 310, 315, 320, 325, 330, 335, and 340. MCMs 200, 205, 210, 215, 220, 225, 230, and 235 contain gating circuitry identical to that of MCM 205. Gating circuitry 237 is used to provide control to those timing dependent components which cannot reliably be reached in a single, master clock cycle. To do this, gating circuitry 237 generates the Clock Synch Point signal, derives an internal Clock Event signal from an external Clock Event signal, and eventually, stops or starts the master clock pulse train on timing dependent components 310, 315, 320, 325, 330, 335, and 340. Gating circuitry 237 along with the Clock Synch Point signal and the external and internal Clock Event signals will be described in the text accompanying FIGS. 4 through 5D.

Figure 4:
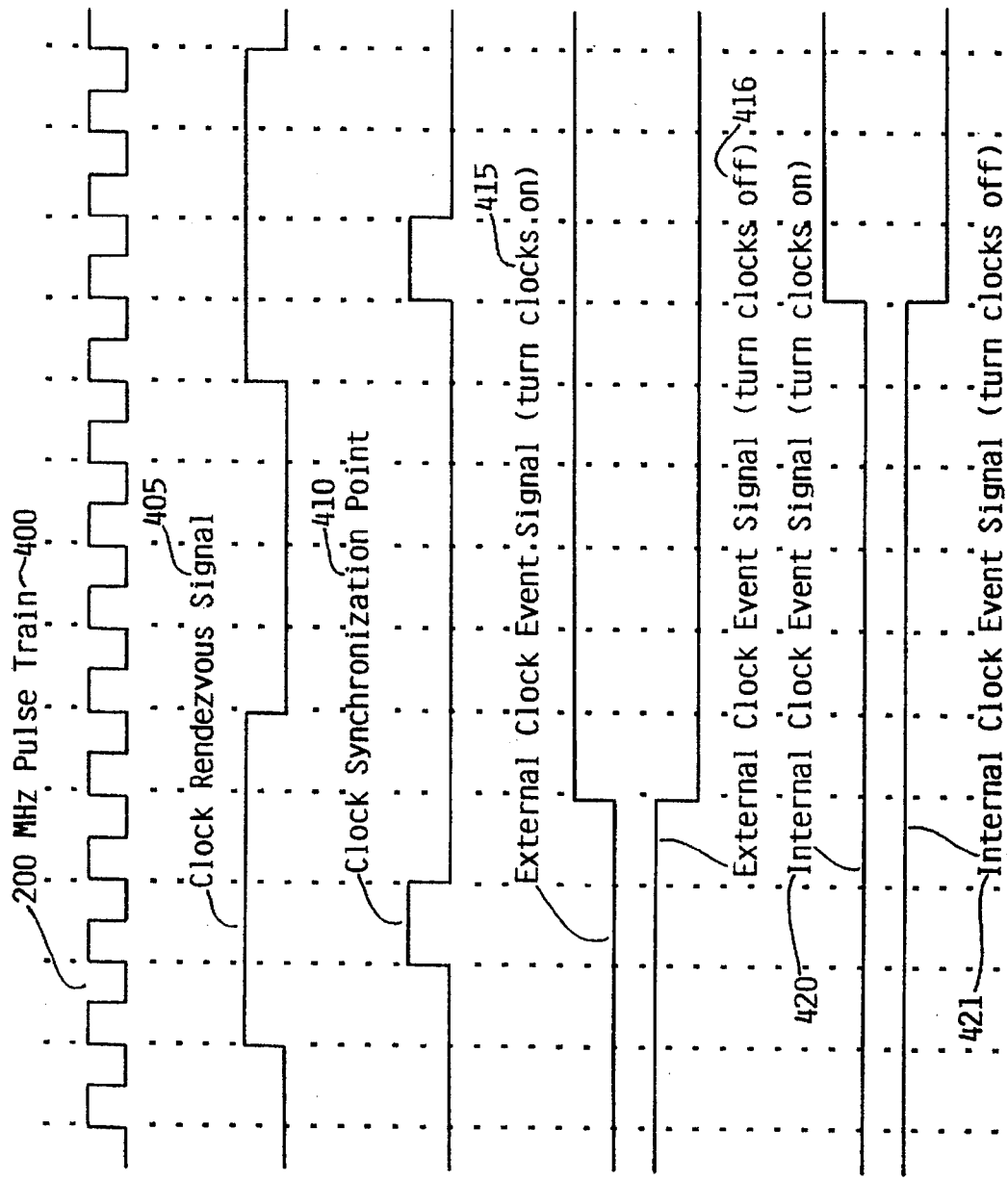
FIG. 4 Is the timing chart for the control signals of the present invention.

FIG. 4 is a timing chart of the control signals of the present invention. In the preferred embodiment, these signals are produced and handled by the circuitry shown in FIGS. 5A through 5D. However, those of ordinary skill in the art will recognize that variations in the circuitry shown on FIGS. 5A through 5D are possible within the scope of the present invention. Pulse train 400 is generated by oscillator circuitry 250. At the outset, it is important to point out that present invention depends on the presence of a trustworthy master clock. Master clock pulse arrival must be tightly controlled (i.e., an adequate clock skew control mechanism must be present). While the particular clock skew control mechanism used is not of significance to the present invention, the presence of reliable clock skew control is a prerequisite to the present invention.

Pulse train 400 operates at 200 MHz, and therefore, has a cycle time of 5 nanoseconds. Clock Rendezvous Signal 405 is also generated by oscillator circuitry 250. Clock Rendezvous Signal 405 is a 25 MHz signal that is generated via the conventional divide by 8 circuit shown on FIG. 5A. Master clock pulse train 400 is used to clock latch 500. Latch 500 and inverter 505 form a conventional divide by 2 circuit. The pulse train emitted from inverter 505 is, then, a 100 MHz pulse train. This pulse train is divided again by the divide by two circuit formed by latch 510 and inverter 515. The 50 MHz pulse train that is emitted therefrom is once again divided by the divide by 2 circuit formed by latch 520 and inverter 525. The result is a pulse train that operates at ⅛ the speed of the master clock pulse train (i.e., 25 MHz). It is important that the edges of the Clock Rendezvous signal remain unambiguously associated with a particular clock pulse in the master clock pulse train. The preferred way to do this is to use the same clock skew control mechanism on the Clock Rendezvous signal as on the master clock pulse train.

Figure 5A:
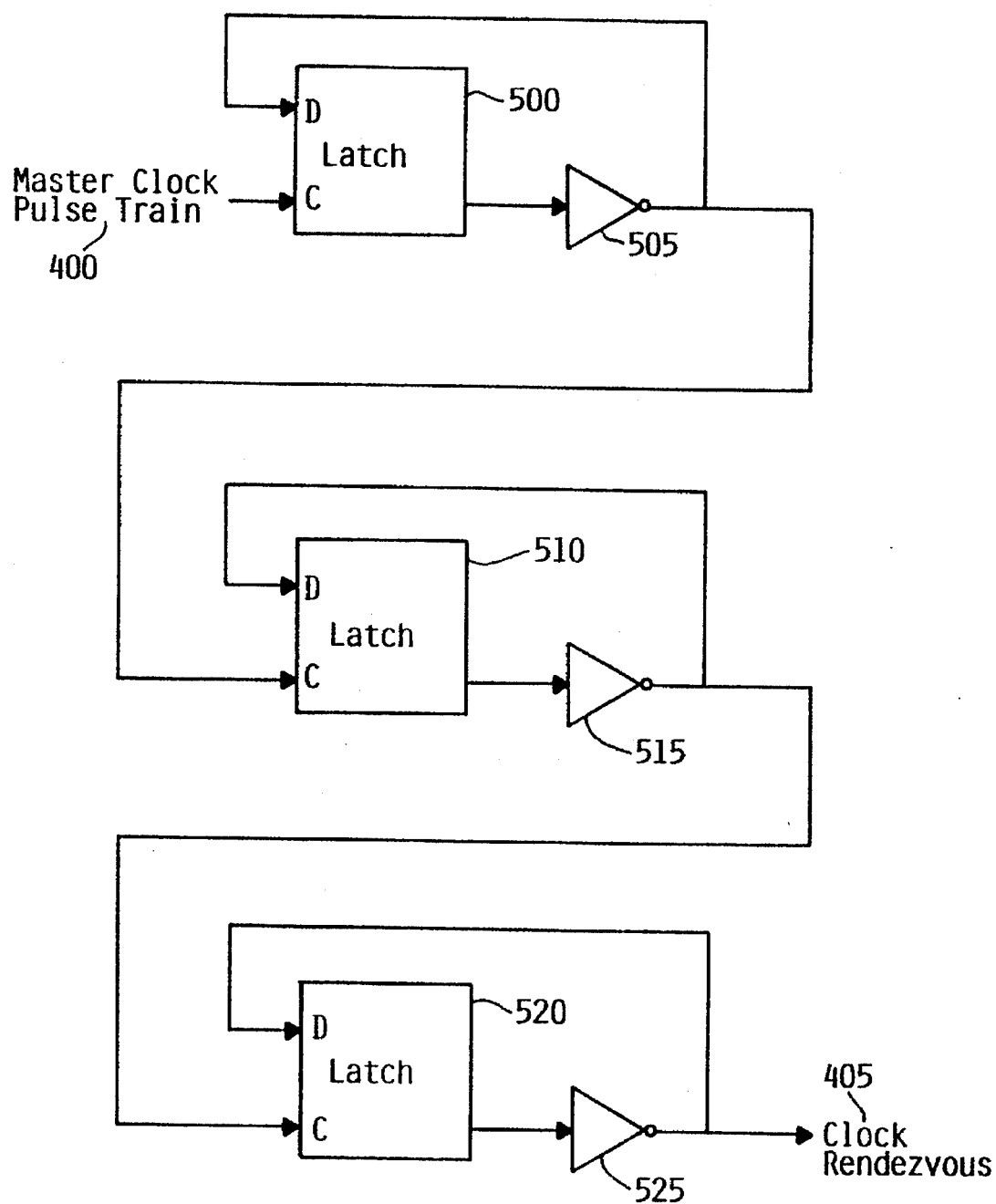
FIG. 5A is a circuit diagram of that part of the master clock circuitry which generates the Clock Rendezvous signal.
Figure 5B:
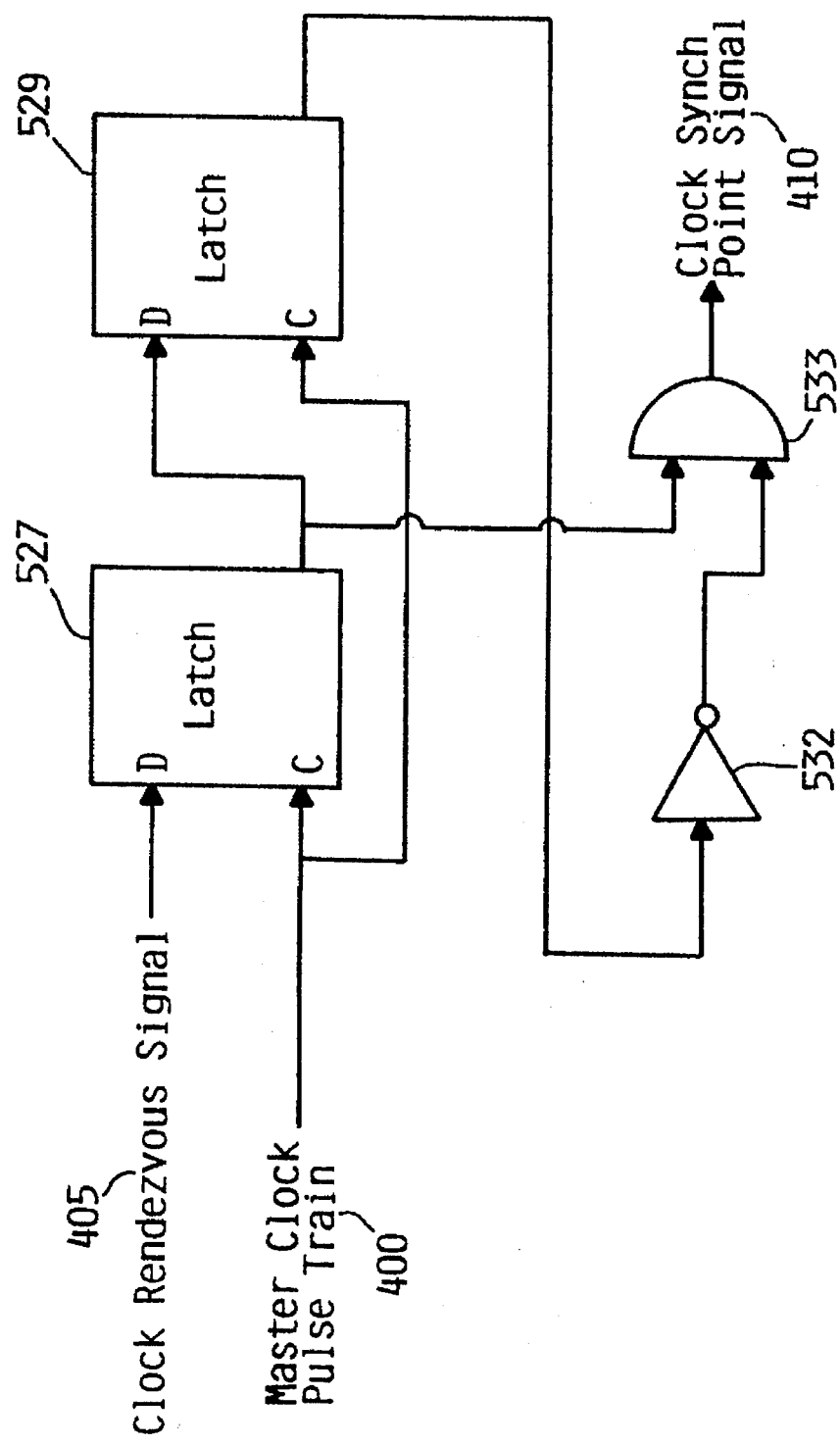
FIG. 5B is a circuit diagram of that part of the gating mechanism circuitry which generates the Clock Synch Point signal.

Because Clock Rendezvous operates at ⅛ the speed of the master clock pulse train, its pulse width is 8 times as long. Hence, when compared to the master clock pulse train, it can be used to select any one of 8 pulses of the master clock pulse train. The pulse that is chosen is used to generate Clock Synch Point 410. In the preferred embodiment the second pulse of the eight is used by all the timing dependent components to generate Clock Synch Point 410. FIG. 5B shows the circuitry used to select a Clock Synch Point on the second pulse of the Clock Rendezvous period. Note: in the preferred embodiment, latch 527 latches Clock Rendezvous signal 405 to avoid on chip timing skew. Latch 529 latches the output of latch 527 and thereby delays Clock Rendezvous signal 405 by an additional cycle. Inverter 532 and AND gate 533 use the output of latches 527 and 529 to create a pulse one clock cycle long on the second candidate pulse of Clock Rendezvous signal 405. This is shown as Clock Synch Point 410 on FIG. 4.

Figure 5C:
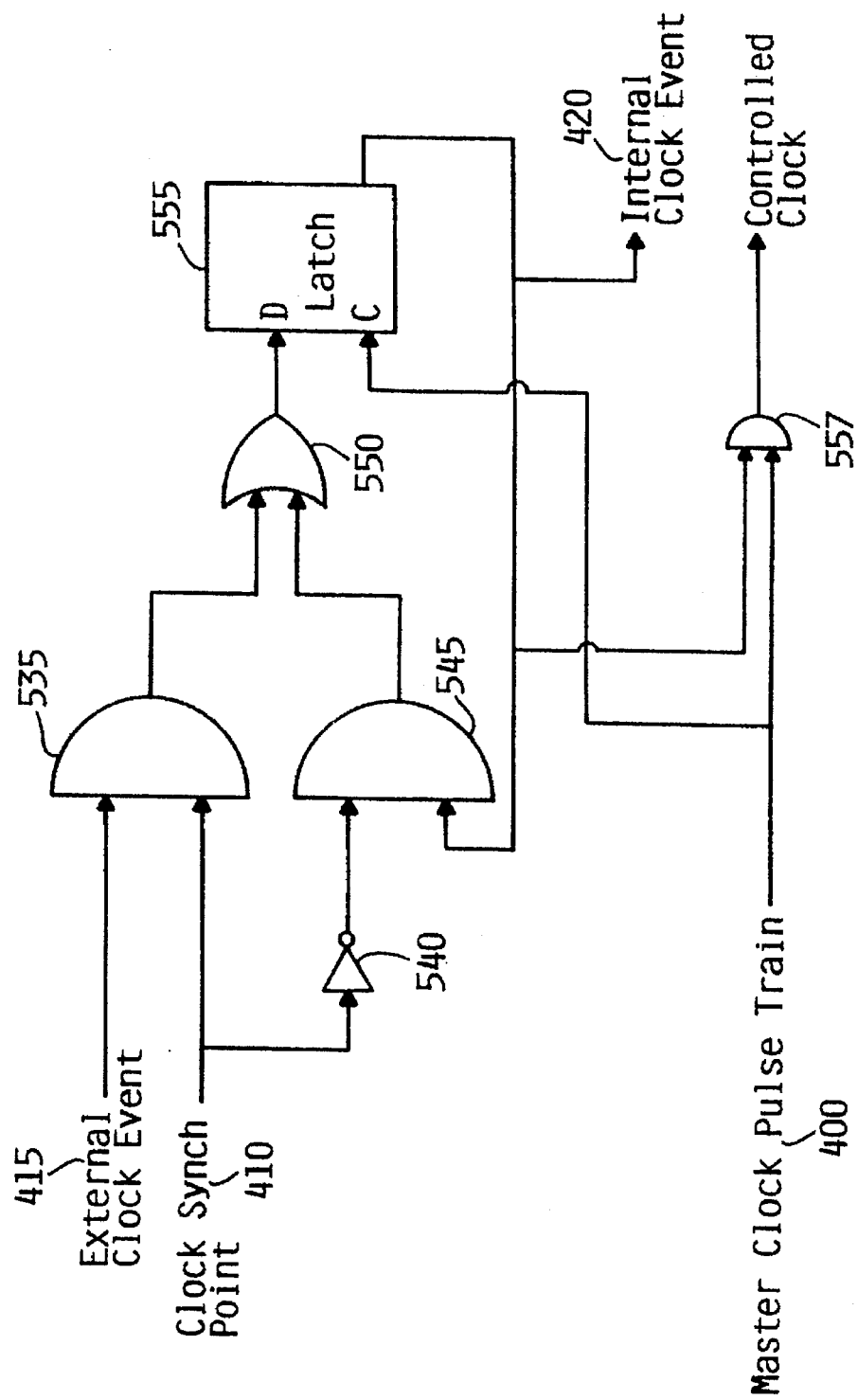
FIG. 5C is a circuit diagram of that part of the gating mechanism circuitry which first converts an External Clock Event signal into an Internal Clock Event signal and then uses the Internal Clock Event Signal to either allow or block access of the master clock pulse train to the internal circuitry of the data processing system.

As shown in FIG. 5C, Clock Synch Point 410 is used as a data gate. Gates 535, 540, 545, and 550 multiplex Clock Synch Point 410 and External Clock Event 415. As mentioned in the Summary section, the mechanism(s) which generate External Clock Event signals must have access to Clock Rendezvous signal 405 so as to provide External Clock Event signals between Clock Synch Points. To this end, the division factor of Clock Rendezvous 405 can be adjusted to ensure that the circuitry used to generate External Clock Event signal 415 can reliably provide the event to all the requisite timing dependent components within one period of Clock Rendezvous signal 405. Therefore, while Clock Rendezvous 405 of the preferred embodiment operated at a speed of ⅛ that of master clock pulse train 400, slower speeds are possible when it is desirable to use even less expensive technology.

Referring again to FIG. 5C, an inactive Clock Synch Point 410 causes latch 555 to retain its state. However, when Clock Synch Point 410 is active, latch 555 latches the value of External Clock Event signal 415. Therefore, Internal Clock Event 420 (i.e., the output of latch 555) can only change at a Clock Synch Point (here Clock Synch Point 410). Internal Clock Event 420 is used in conjunction with AND gate 557 to block or allow access of master clock pulse train 400 to those timing dependent components which cannot reliably be reached in a single cycle.

To summarize the present invention, each appropriate timing dependent component (in this example, each appropriate MCM) includes the gating mechanism circuitry depicted on FIGS. 5B and 5C. Each of these gating mechanisms receive Clock Rendezvous signal 405 and use that signal to generate a series of pulses (i.e., Clock Synch Point signal 410). When an External Clock Event Signal is produced (either External Clock Event signal 415 or 416), these same gating mechanisms translate the signal into an Internal Clock Event signal (i.e., Internal Clock Event signal 420 or 421) which causes the output of latch 555 (FIG. 5C) to change state and, when applied to AND gate 557, either block or allow access of Master Clock Pulse Train 400 from/to the internal circuitry of the subject MCM.

Figure 5D:
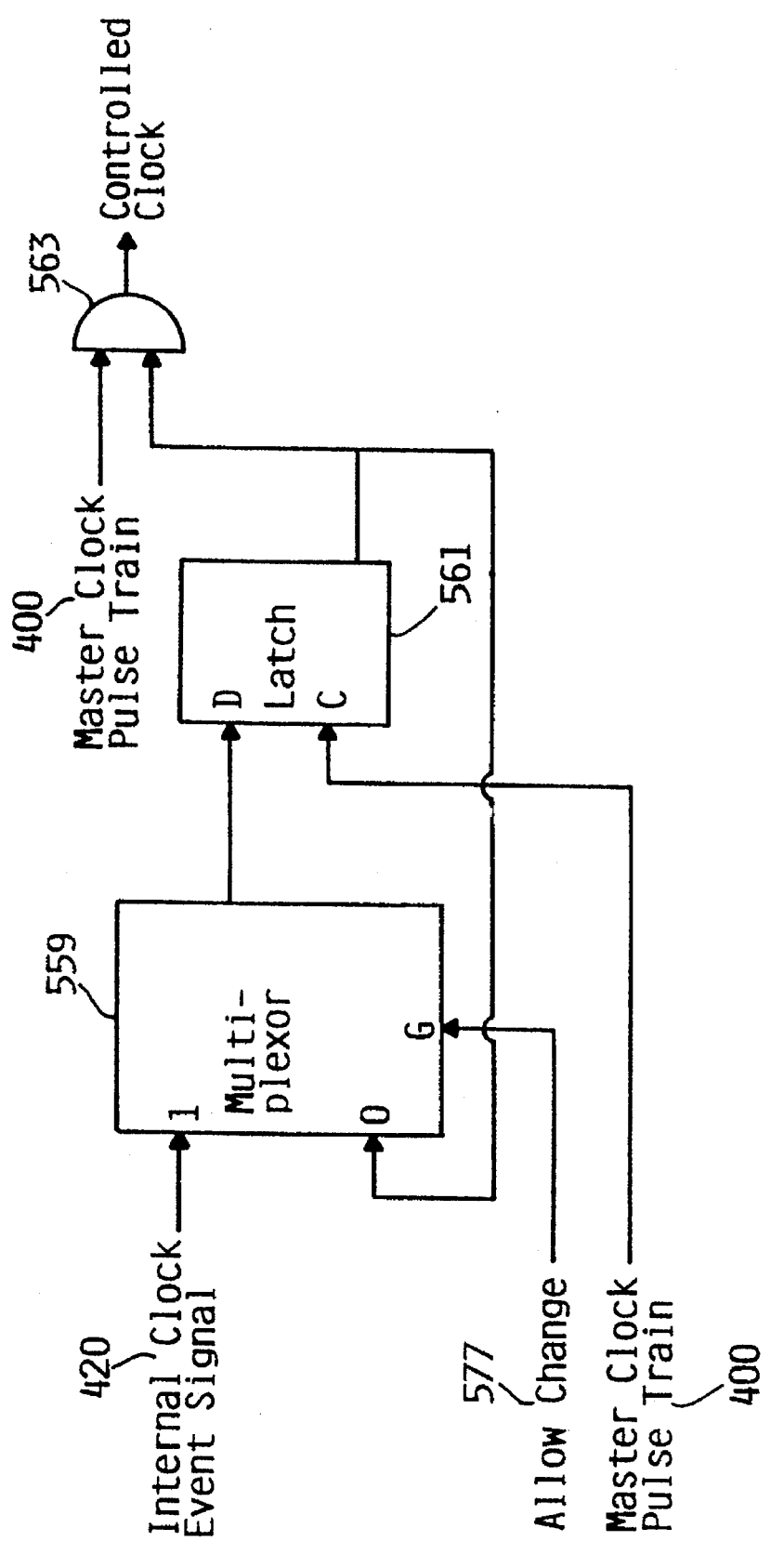
FIG. 5D is a circuit diagram of gating mechanism circuitry which could be added in an alternate embodiment to further control access of a master clock pulse train to timing dependent components.

FIG. 5D shows additional circuitry which, while more expensive, could be used in an alternative embodiment to provide increased reliability. Allow Change signal 577 has also been added. When active, Allow Change signal 577 causes multiplexer 559 to allow Internal Clock Event signal 420 to pass on to latch 561. If Allow Change signal 577 is not active, latch 561 retains its state and thereby helps guard against a spurious Internal Clock Event signal 420 possibly caused by noise on External Clock Event signal 415.

Although a specific embodiment along with an alternative embodiment of the present invention have been disclosed, it will be understood by those skilled in the art that additional variations in form and detail may be made within the scope of the following claims.

We claim as our invention:

1. A digital system comprising:
   clock generating means for producing a master clock pulse train signal, said master clock pulse train being comprised of a series of clock pulses;
   clock control logic means for producing a clock rendezvous signal;
   external clock event generating means for producing an external clock event signal;
   an external timing bus carrying said master clock pulse train signal, said clock rendezvous signal and said external clock event signal;
   a plurality of timing dependent components, at least two of said timing dependent components being situated within said digital system such that they are not subject to single cycle control, said at least two of said timing dependent components comprising:
      a plurality of mutually interconnected digital logic circuits for executing predetermined functions in response to said master clock pulse train signal; and
      a gating mechanism, said gating mechanism having means coupled to said external timing bus for receiving said master clock pulse train and said clock rendezvous signal and means for generating a clock synchronization point signal, said clock rendezvous signal, said external clock event signal, and said clock rendezvous signal being used by said gating mechanism to allow and block said master clock pulse train signal from accessing said at least two of said timing dependent components on the same pulse of said master clock pulse train.

2. The digital system of claim 1 wherein said digital system includes dividing means, said dividing means receiving said master clock pulse train and creating said clock rendezvous signal therefrom.

3. The digital system of claim 1 wherein said gating mechanism includes identifying means for receiving said master clock pulse train and said clock rendezvous signal so as to identify candidate pulses within said master clock pulse train.

4. The digital system of claim 3 wherein said gating mechanism includes selecting means to receive said clock synchronization point signal and select pulses from said candidate pulses, each of said pulses being available for use by said gating mechanism in blocking said master clock pulse train signal from reaching the internal circuitry of said timing dependent component.

5. The digital system of claim 3 wherein said gating mechanism includes selecting means to receive said clock synchronization point signal and select pulses from said candidate pulses, each of said pulses being available for use by said gating mechanism in allowing said master clock pulse train signal to reach the internal circuitry of said timing dependent component.

6. The digital system of claim 4 wherein said gating mechanism includes stopping means for receiving said external clock event signal and for blocking access of said master clock pulse train upon a selected pulse identified by said third control signal.

7. The digital system of claim 4 wherein said gating mechanism includes starting means for receiving said external clock event signal and for allowing access of said master clock pulse train upon a selected pulse identified by said third control signal.

8. A method for controlling a master clock pulse train signal of a digital system, said master clock pulse train being comprised of a series of clock pulses and being generated by a master clock oscillator, said method comprising the steps of:
   generating a clock rendezvous signal and an external clock event signal, said clock rendezvous signal and said external clock event signal being generated by clock control logic;
   receiving said clock rendezvous signal and said external clock event signal, said clock rendezvous signal and said external clock event signal being received by a gating mechanism;
   generating a clock synchronization point signal, said clock synchronization point signal being generated by said gating mechanism;
   blocking said master clock pulse train from reaching, and allowing said master clock pulse train to reach, at least two timing dependent components of said digital system on the same clock pulse of said master clock pulse train, said blocking step being performed based on said clock rendezvous signal, said external clock event signal, and said clock synchronization point signal, said at least two timing dependent components being situated within said digital system such that they are not subject to single cycle control.

9. The method of claim 8 wherein said step of generating said clock rendezvous signal and said external clock event signal further comprises dividing said master clock pulse train signal to generate said clock rendezvous signal.

10. The method of claim 8 wherein said step of blocking and allowing said master clock pulse train signal further comprises the step of using said clock rendezvous signal to identify candidate pulses within said master clock pulse train.

11. The method of claim 10 wherein said step of blocking and allowing said master clock pulse train signal further comprises the step of selecting pulses from said candidate pulses, each of said selected pulses being available to begin blocking said master clock pulse train signal from reaching said timing dependent component.

12. The method of claim 10 wherein said step of blocking and allowing said master clock pulse train signal further comprises the step of selecting pulses from said candidate pulses, each of said pulses being available to begin allowing said master clock pulse train signal to reach said timing dependent component.

13. The method of claim 11 wherein said step of blocking and allowing said master clock pulse train signal further comprises the step of blocking access of said master clock pulse train upon a selected pulse identified by said clock synchronization point signal.

14. The method of claim 11 wherein said step of blocking and allowing said master clock pulse train further comprises the step of allowing access of said master clock pulse train signal upon a selected pulse identified by said clock synchronization point signal.

15. A method for controlling a master clock pulse train signal of a digital system, said master clock pulse train being comprised of a series of clock pulses and being generated by a master clock oscillator, said method comprising the steps of:

receiving said master clock pulse train, said master clock pulse train by a gating mechanism;

generating a clock rendezvous signal and an external clock event signal, said external clock event signal being generated based on an external clock event;

generating a clock synchronization point signal, said clock synchronization point signal being generated by said gating mechanism;

blocking said master clock pulse train from reaching, and allowing said master clock pulse train to reach, at least two timing dependent components of said digital system on the same clock pulse of said master clock pulse train, said blocking step being performed based on said clock rendezvous signal, said external clock event signal, and said clock synchronization point signal, said at least two timing dependent components being situated within said digital system such that they not subject to single cycle control.

16. The method of claim 15 wherein said clock rendezvous signal is generated by dividing said master clock pulse train signal.

17. The method of claim 16 wherein said step of blocking and allowing said master clock pulse train signal further comprises the step of using said clock rendezvous signal to identify candidate pulses within said master clock pulse train.

18. The method of claim 17 wherein said step of blocking and allowing said master clock pulse train signal further comprises the step of selecting pulses from said candidate pulses, each of said selected pulses being available to begin blocking said master clock pulse train signal from reaching said timing dependent component.

19. The method of claim 17 wherein said step of blocking and allowing said master clock pulse train signal further comprises the step of selecting pulses from said candidate pulses, each of said pulses being available to begin allowing said master clock pulse train signal to reach said timing dependent component.

20. The method of claim 18 wherein said step of blocking and allowing said master clock pulse train signal further comprises the step of blocking access of said master clock pulse train upon a selected pulse identified by said clock synchronization point signal.

21. The method of claim 18 wherein said step of blocking and allowing said master clock pulse train further comprises the step of allowing access of said master clock pulse train signal upon a selected pulse identified by said clock synchronization point signal.

* * * * *